(12) United States Patent
Kim et al.

(10) Patent No.: US 6,853,434 B2
(45) Date of Patent: Feb. 8, 2005

(54) LIQUID CRYSTAL DISPLAY DEVICE WITH PLASTIC SUBSTRATE

(75) Inventors: Hyang Yul Kim, Kyoungki-do (KR); Seung Hee Lee, Kyoungki-do (KR)

(73) Assignee: Boe-Hydis Technology Co., Ltd., Kyounghki-do (KR)

( * ) Notice: Subject to any disclaimer, the term of this patent is extended or adjusted under 35 U.S.C. 154(b) by 106 days.

(21) Appl. No.: 10/331,405

(22) Filed: Dec. 30, 2002

(65) Prior Publication Data

US 2003/0123019 A1 Jul. 3, 2003

(30) Foreign Application Priority Data

Dec. 31, 2001 (KR) .............................. 10-2001-0089255

(51) Int. Cl.$^7$ ............................................ G02F 1/1333

(52) U.S. Cl. ...................... 349/160; 349/158; 349/187

(58) Field of Search .......................... 349/58, 158, 160, 349/187

(56) References Cited

U.S. PATENT DOCUMENTS

| | | | |
|---|---|---|---|
| 5,742,006 A | * | 4/1998 | Grupp et al. ............... 174/52.2 |
| 6,113,801 A | | 9/2000 | Savant et al. |
| 6,127,199 A | | 10/2000 | Inoue et al. |
| 6,136,444 A | | 10/2000 | Kon et al. |
| 6,171,663 B1 | | 1/2001 | Hanada et al. |
| 6,243,068 B1 | | 6/2001 | Evanicky et al. |
| 6,285,834 B1 | | 9/2001 | Hylen |
| 6,304,309 B1 | | 10/2001 | Yamanaka et al. |
| 6,335,775 B1 | | 1/2002 | Iwamura et al. |
| 6,342,097 B1 | | 1/2002 | Terry et al. |
| 6,639,645 B2 | * | 10/2003 | Sakuwa ..................... 349/158 |

* cited by examiner

Primary Examiner—Tarifur R. Chowdhury
Assistant Examiner—Michael H Caley
(74) Attorney, Agent, or Firm—Ladas & Parry LLP

(57) ABSTRACT

A liquid crystal display device with plastic substrates is disclosed, which comprises: a subsidiary substrate, upper and lower plastic substrates including edge grooves and being fixed on the subsidiary substrate by heat resistant tapes and being joined with liquid crystals sealed there-between, and alignment layers formed on the surfaces which face one another of the upper and lower plastic substrates.

13 Claims, 7 Drawing Sheets

LIQUID CRYSTAL DISPLAY DEVICE WITH PLASTIC SUBSTRATE

BACKGROUND OF THE INVENTION

1. Field of the Invention

The present invention relates to a liquid crystal display device, and more particularly to a liquid crystal display device equipped with plastic substrates, which has a light weight and can be prevented from breakage occurring through being dropped while in use.

2. Description of the Prior Art

As generally known in the art, a liquid crystal display (LCD) device is generally utilized as a screen for displaying information in a mobile terminal, following the development of wireless mobile telecommunication.

The liquid crystal display device employs a structure, in which a pair of glass substrates is generally joined together with liquid crystals being sealed there-between. However, recently it has become required that a substrate which is employed in a liquid crystal display device for a mobile terminal should be light in weight for ease in use, so that glass substrates have been changed to plastic substrates.

Highly polymerized compounds with a heat resistant property for temperatures up to 150 to 200° C., such as polycarbonate, polyimide, PES (polyether sulfone), PAR, PEN (polyethylene), and PET (polyether), are used as materials for plastic substrates.

A method for manufacturing a liquid crystal display device using a conventional plastic substrate is explained below with regard to FIGS. 1A to 1C.

Referring to FIG. 1A, a plastic substrate 10 with desired lower layer patterns (not shown), including a TFT and pixel electrodes, is provided. The plastic substrate is placed on a stage 1 with a vacuum hole 2, and fixed on the stage 1 with vacuum pressure.

Referring to FIG. 1B, an alignment material is coated on a fixed plastic substrate 10 by means of an offset printing method using a transfer plate 3. In FIG. 1B, the numeral 5 in the drawing refers to a coating roll.

Referring now to FIG. 1C, the coated alignment material is rubbed by a rubbing rag 6, to result in producing an alignment layer 11a on the substrate 10, which controls initial alignment of liquid crystal molecules. The numeral 7 in the drawing refers to a rubbing roll.

Next, although not shown in the drawings, lower substrate and upper substrate, to which alignment layers are formed through the above processes, are joined by sealing materials, and then liquid crystal molecules are filled in a space made between the substrates, resulting in the production of a liquid crystal display device incorporating plastic substrates.

However, according to the above explained prior art, a plastic substrate is transformed into a non-homogeneous shape owing to a curling property of the substrate, which occurs during fixture to the stage, and the vacuum pressure applied to fix the substrate. As stated above, a plastic substrate curls up away from the stage in undesired place including an edge thereof.

Accordingly, as the applied pressure is different in different regions owing to variation in height of the surface of the plastic substrate, the alignment materials are coated non-uniformly, and also the alignment layer, which is produced by rubbing of the alignment materials, is subjected to non-uniform rubbing over the whole substrate owing to variation of the friction between the rubbing rags and the alignment materials, produced by the vacuum pressure applied in the rubbing process and the non-uniformly coated alignment materials.

Further, as the non-uniform rubbing of the alignment layer produces a non-uniformity in cell gaps, the picture quality of a liquid crystal display device is reduced owing to the non-uniform cell gap.

Conventionally, to solve the above problems of the prior art, it had been proposed that the plastic substrate be fixed to the stage using a subsidiary substrate such as glass substrate and a thermal resistant tape.

However, although this prior art can prevent the plastic substrate from being non-desirously transformed, a non-uniformity of rubbing is produced in the fixing tape, which corresponds to the height of the surface of the tape, when the alignment materials are subjected to rubbing. As shown in FIG. 2, a non-uniformity of cell gaps is produced to a height of about 30 to 100 $\mu$m which corresponds to the height of the stacked fixing tape 26, when the plastic lower substrate 22 and upper substrate 24 are joined.

In FIG. 2, reference numeral 21 denotes a subsidiary substrate, 28 denotes a sealing material, d1 denotes the height of the stacked fixing tape 26, which is approximately 60 to 200 $\mu$m, and d2 denotes a cell gap, which is approximately 3 to 8 $\mu$m.

However, this technique can not finally solve the problems in the prior art whereby the picture quality of the liquid crystal display device is decreased due to the non-uniformity of cell gaps.

SUMMARY OF THE INVENTION

Accordingly, the present invention has been made to solve the above-mentioned problems occurring in the prior art, and an object of the present invention is to provide a liquid crystal display device using a plastic substrate, which can improve non-uniformity of the plastic substrate, non-uniformity of the coating in the alignment materials, non-uniformity in the rubbing of the alignment materials, and non-uniformity in the cell gap.

Another object of the present invention is to provide a liquid crystal display device which has improved picture quality by way of securing uniform cell gaps.

In order to accomplish these objects, there is provided a liquid crystal display device with plastic substrates comprising: a subsidiary substrate, upper and lower plastic substrates including edge grooves and being fixed on the subsidiary substrate by heat resistant tapes, the upper and lower plastic substrates being joined with liquid crystals sealed there-between, and alignment layers formed on the surfaces which face one another of the upper and lower plastic substrates.

The upper and lower plastic substrates have a thickness of 200 to 700 $\mu$m, and the edge grooves of the plastic substrates have a depth of 100 to 350 $\mu$m.

Also, the edge grooves are alternatively formed along the long sides, along the short sides or along all four sides of the upper and lower plastic substrates, and are formed in a continuous or interrupted groove configuration.

Further, the subsidiary substrate is made of any one material selected from a group including glass, acrylic materials, and metals, and has a size equal to or bigger than the depth of the plastic substrates.

The heat resistant tape has a thickness thinner than the depth of the edge grooves in the plastic substrates.

The upper and lower plastic substrates with edge grooves are fabricated by a roll compression method employing a main roll with convex groove patterns and a subsidiary roll below, or a press method with a mold frame having convex groove patterns.

Also, a radius r of the main roll in the roll compression method satisfies the relation 2πr=L, in which L is a length of the plastic substrate.

Further, the convex groove patterns have a width two times larger than that of the edge grooves of the plastic substrate, and a length equal to that of the edge grooves of the plastic substrate.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings.

Figure 1A:
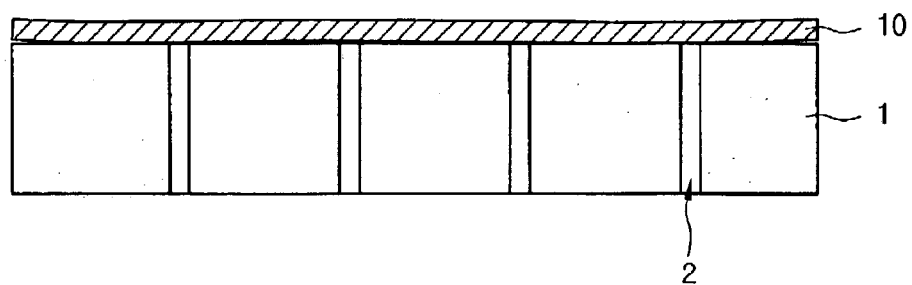
FIGS. 1A to 1C are views showing each step of a method for fabricating a liquid crystal display device using conventional plastic substrates.
Figure 1B:
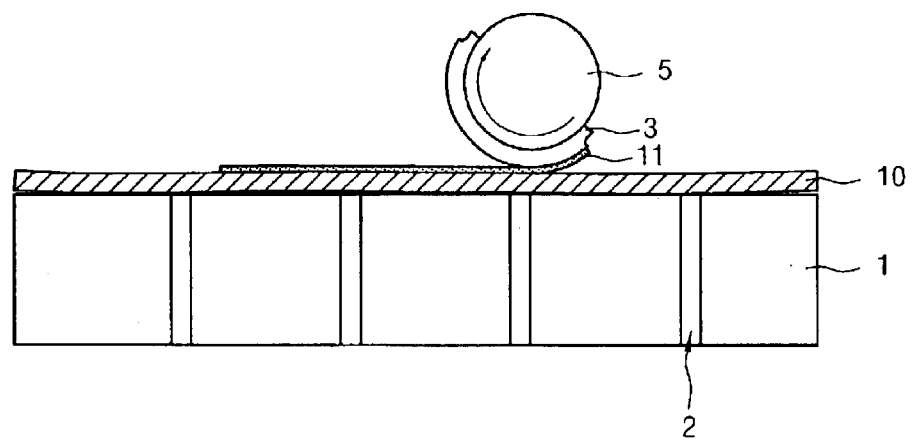
Figure 1C:
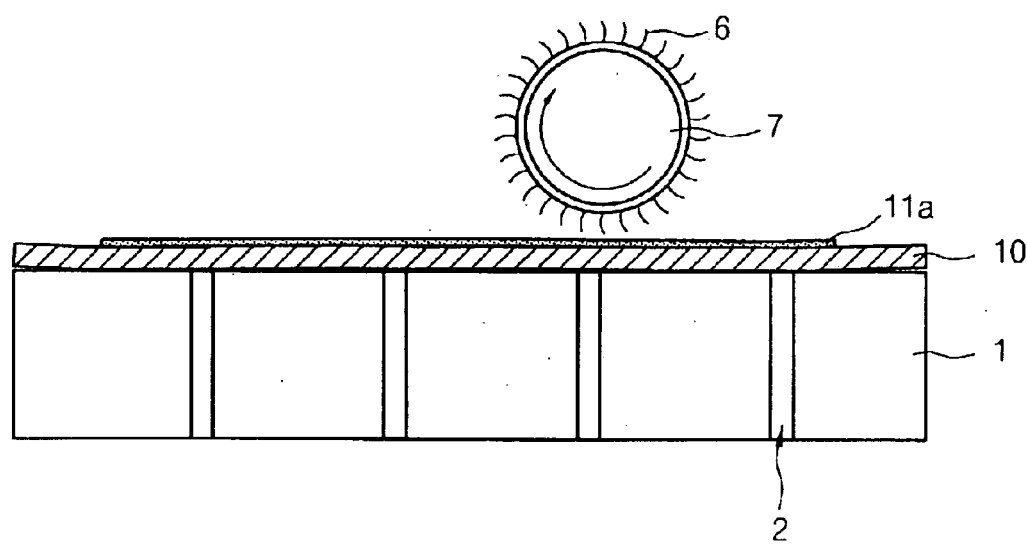
Figure 2:
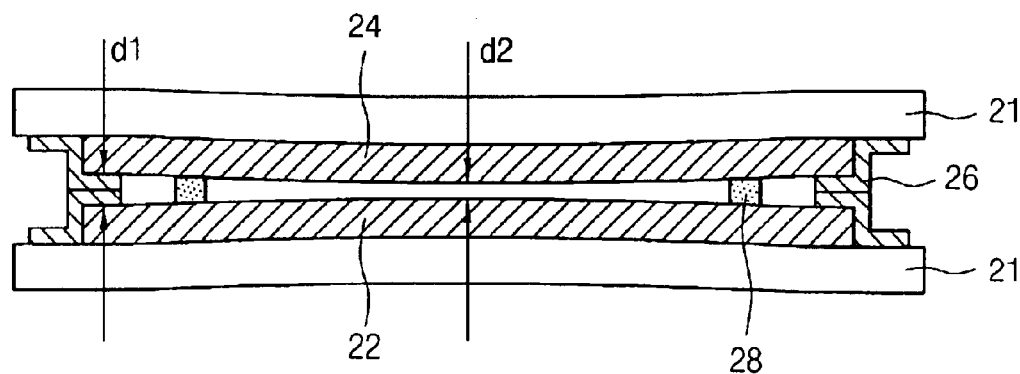
FIG. 2 is a sectional view showing a conventional liquid crystal display device using plastic substrates.
Figure 3A:
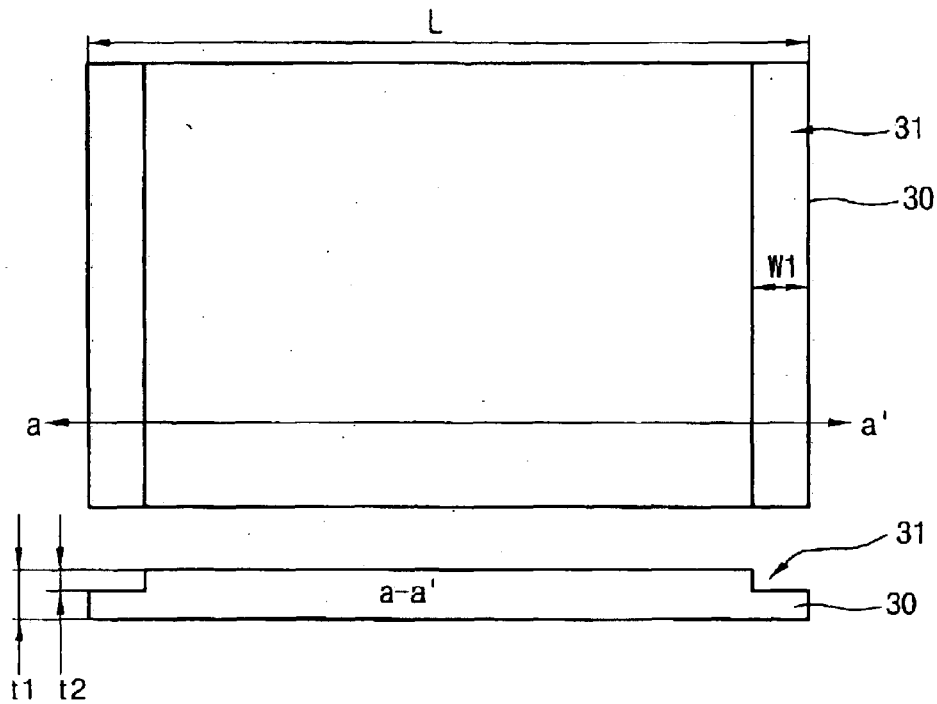
FIG. 3A and FIG. 3B are a planar view and a sectional view, respectively showing a plastic substrate incorporated in a liquid crystal display device in accordance with the present invention.
Figure 3B:
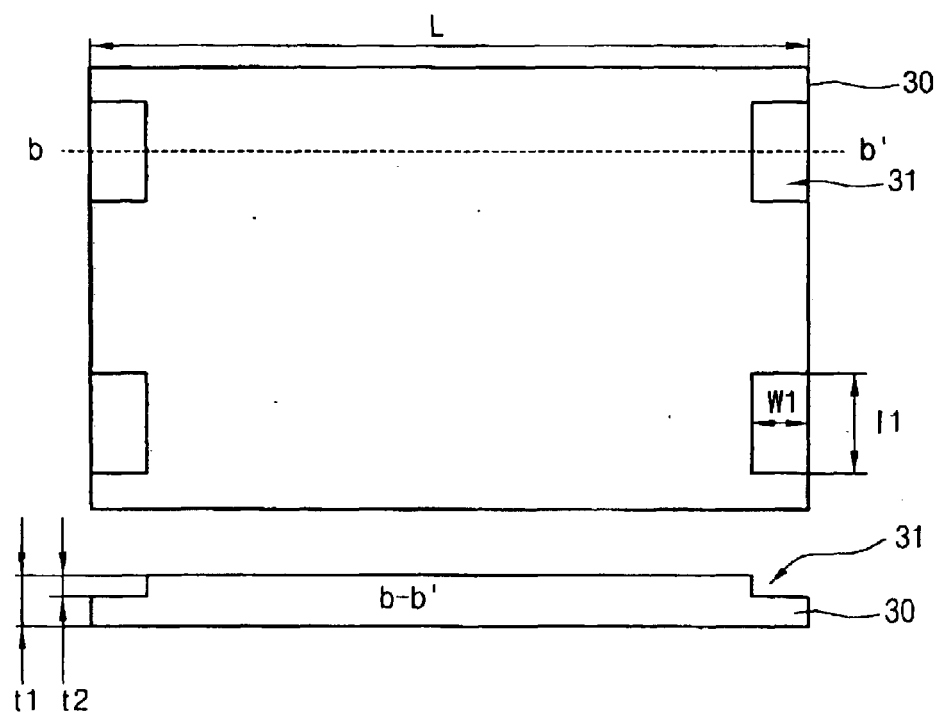

Referring to FIGS. 3A and 3B, a plastic substrate 30 includes a thin edge groove 31 along edges thereof. The substrate 30 has a thickness t1 of 200 to 700 μm, and the edge groove 31 has a depth t2 which is a half of the thickness of the substrate 30. In this embodiment, the depth t2 of the edge groove 31 should be bigger than the thickness of the heat resistant fixing tape or the substrate fixing device which will be explained below. The edge groove 31 can be formed at any side of the substrate 30 including long sides and short sides, and can be formed at all four sides.

Further, as shown in FIG. 3A, the edge groove 31 can be formed at an edge of the substrate 30 in a continuous groove configuration, and as shown in FIG. 3B, can be formed at a desired portion of the edge in the substrate 30 in an interrupted groove configuration.

The edge groove 31 has a width W1 enough to safely fix the plastic substrate 30 by the fixing tape or substrate fixing device, and for example, the width W1 may be of 0.3 to 1.5 mm.

Figure 4:
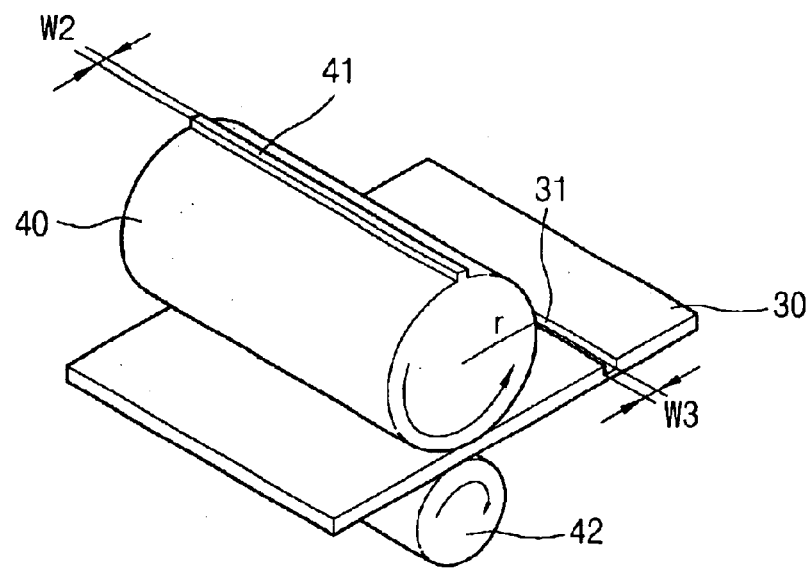
FIGS. 4 to 6 are views showing a method for fabricating a plastic substrate according to one embodiment of the present invention.
Figure 5:
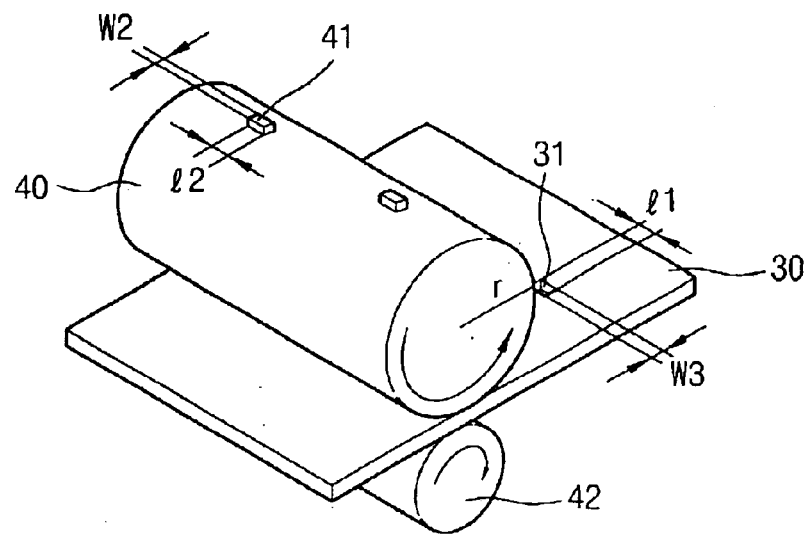
Figure 6:
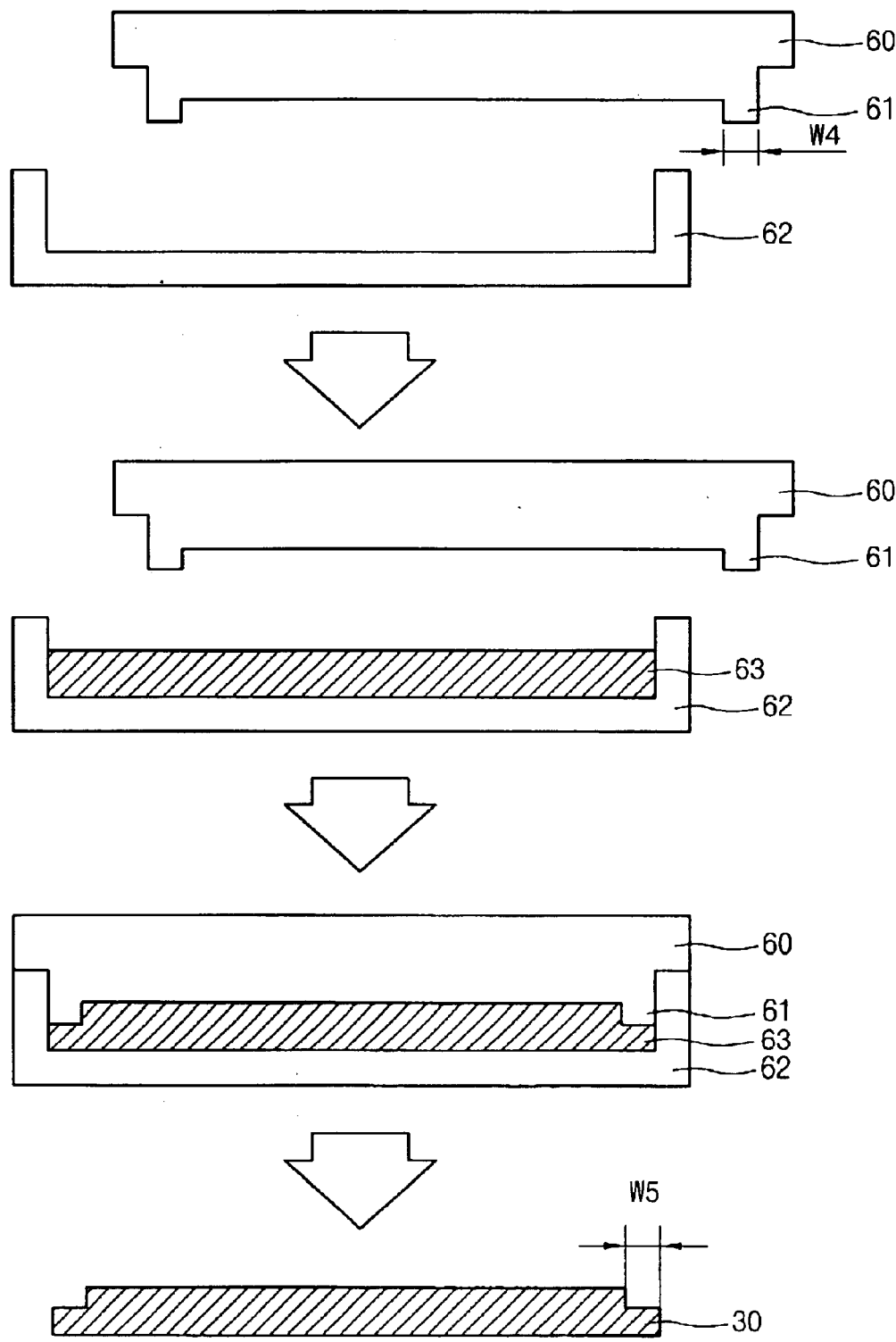

FIGS. 4 to 6 are views showing a method for fabricating a plastic substrate in accordance with one embodiment of the present invention.

Referring to FIGS. 4 and 5, the plastic substrate 30 can be fabricated by means of a roll compression method employing a main roll 40 with a convex groove pattern 41 on a surface thereof and a subsidiary roll 42 attached below the main roll.

As shown in FIG. 4, the convex groove pattern 41 of the main roll 40 can be formed in a continuous stripe configuration which corresponds to FIG. 3A, and can be formed in an interrupted shape as shown in FIG. 3B.

The convex groove pattern 41 of the main roll 40 has a width W2 of 0.6 to 3 mm, which is two times the width of the edge groove in the substrate 30. W3 denotes a width of the groove 31 made in a circular plastic substrate 30, and W3 is the same as the width W2 of the convex groove pattern 41.

The main roll 40 has a radius r satisfying the equation 2πr=L, in which L is a length of the substrate 30. For example, when the length L is 470 mm, the radius r of the main roll 40 is 74.8 mm.

Referring to FIG. 5, the convex groove pattern 41 has a length l 2 that is the same as a length l 1 of the edge groove 31 in the groove 30, which is a length enough to fix the substrate 30 stably by the heat resistant fixing tape or the substrate fixing device employed in a liquid crystal fabricating process, for example, the length l 2 is of 3 to 10 cm.

Referring to FIG. 6, the plastic substrate 30 of the present invention can be fabricated by means of a press method using a lower mold frame 62 in which a plastic solution 63 is filled and an upper mold frame 60 equipped with a convex groove pattern 61.

In this case, the plastic solution 63 is first filled in the lower mold frame 62, and then the plastic solution 63 is pressed by the upper mold frame 60 equipped with the convex groove pattern 61, resulting in the formation of the plastic substrate 30 including the edge groove 31. In this instance, the width W4 of the convex groove pattern 61 is of approximately 0.3 to 1.5 mm, which is the same as the width W5 of the edge groove of the substrate 30.

Figure 7A:
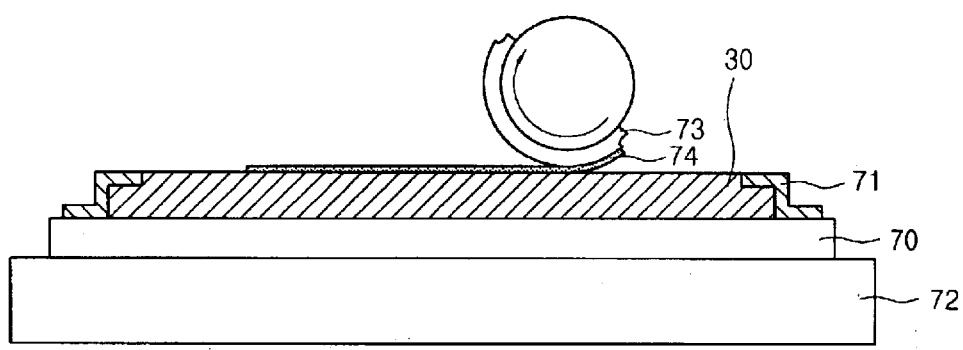
FIGS. 7A to 7C are views showing a method for fabricating a liquid crystal display device using plastic substrates according to one embodiment of the present invention.
Figure 7B:
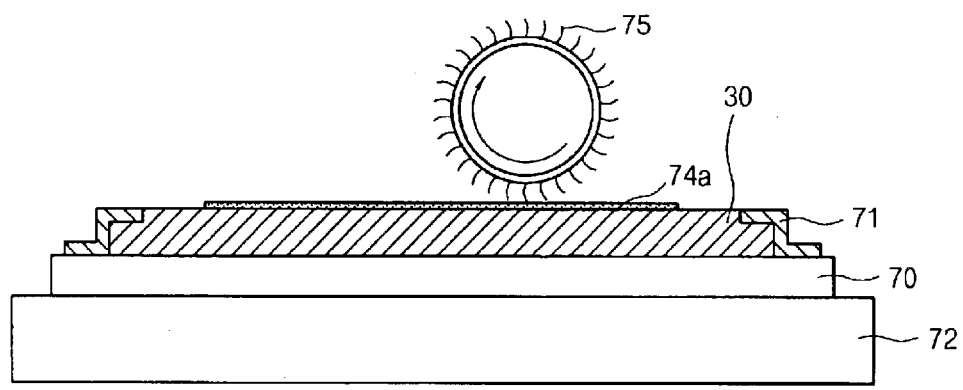
Figure 7C:
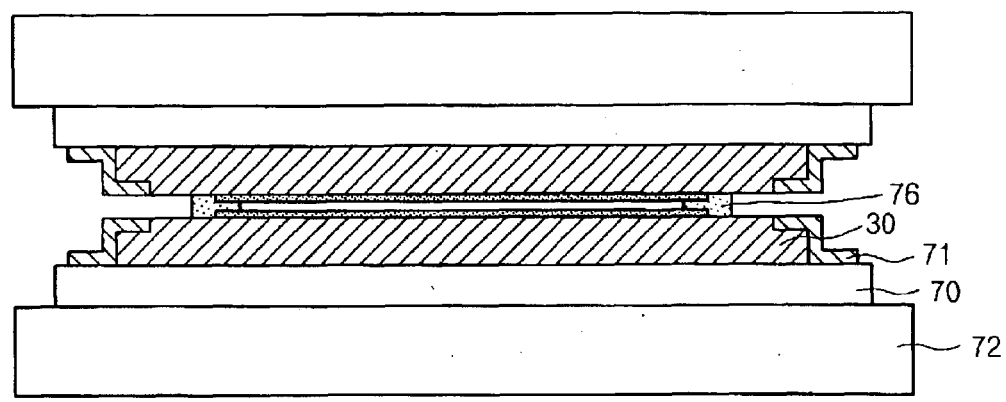

FIGS. 7A to 7C are sectional views showing each step of the method for fabricating a liquid crystal display device using a plastic substrate in accordance with one embodiment of the present invention.

Referring to 7A, the plastic substrate 30 is arranged on a subsidiary substrate 70, and fixed on the substrate 70 by heat resistant fixing tape 71. The subsidiary substrate 70 is made of glass, acrylic materials, or metals such as SUS, preferably made of glass substrate. The subsidiary substrate 70 is fixed to a processing table 72 by vacuum pressure.

Then, alignment materials are coated on the plastic substrate 30 by means of an off-set printing method using a transfer plate 73. Tn this instance, the plastic substrate 30 is arranged on the subsidiary substrate 70, and fixed by heat resistant tape 71, thereby preventing the transformation into a non-uniform shape. Also, the alignment materials 74 can be coated uniformly, as they are coated on the even surface of the plastic substrate 30.

Referring to FIG. 7B, the alignment materials are subjected to rubbing by a rubbing rag 75, resulting in an alignment layer 74a on the substrate 30 which controls the initial alignment of the liquid crystal molecules. In this instance, as the plastic substrate is fixed by the heat resistant tape 71, the friction forces between the rubbing rag 75 and the alignment materials are equal during the time of rubbing, resulting in the formation of a uniformly rubbed alignment layer 74a.

Referring now to FIG. 7C, the lower and upper plastic substrates 30 on which the alignment layers are formed are joined by the sealing materials, and then liquid crystals (not shown) are filled in the space made between the substrates 30, resulting in incorporating a liquid crystal display device having a plastic substrate in accordance with the present invention. In this instance, as the heat resistant tape 71 does not affect the cell gaps, the liquid crystal display device of the present invention has uniform cell gaps, resulting in improved picture quality.

Thereafter, although not shown in the drawings, a processing table and the subsidiary substrate and the heat resistant tape are removed.

Figure 8:
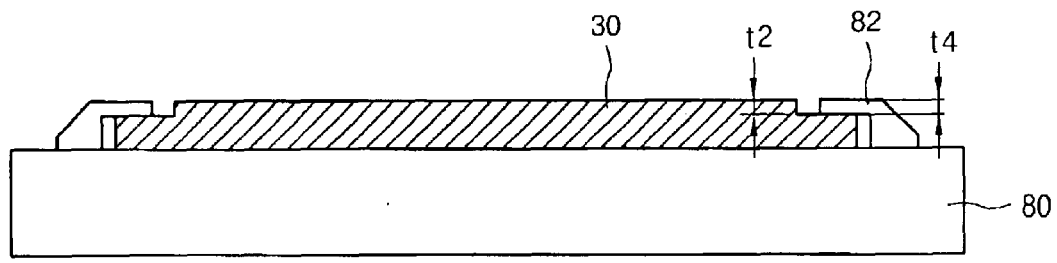
FIG. 8 is a sectional view showing a plastic substrate fixed to a process table in accordance with another embodiment of the present invention.

FIG. 8 is a sectional view showing a plastic substrate fixed at a process table in accordance with another embodiment of the present invention.

According to this embodiment of the present invention, a plastic substrate 30 with an edge groove is attached at a process table 80 equipped with a substrate fixing device 82 without employing a subsidiary substrate or a heat resistant tape. The substrate fixing device 82 has a thickness t4 which is thinner than the depth t2 of the edge groove in the substrate 30 in order to prevent non-uniformity of rubbing at the time of rubbing alignment materials and non-uniformity of the cell gaps at the time of joining the substrates, and for example, the thickness t4 may be 50 to 300 mm.

In accordance with the liquid crystal display device using a plastic substrate of the present invention, alignment materials are uniformly coated over an entire region of the substrate, the alignment materials can be uniformly subjected to rubbing, and uniform cell gaps can be obtained. Accordingly, the liquid crystal display device of the present invention can provide improved brightness characteristics and high picture quality.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A liquid crystal display device with plastic substrates, the liquid crystal display device comprising: a subsidiary substrate; upper and lower plastic substrates including edge grooves and being fixed on the subsidiary substrate by heat resistant tape disposed within the edge grooves, the upper and lower plastic substrates being joined with liquid crystals sealed therebetween; and alignment layers formed on the surfaces which face one another of the upper and lower plastic substrates.

2. The liquid crystal display device according to claim 1, wherein upper and lower plastic substrates have a thickness of 200 to 700 μm.

3. The liquid crystal display device according to claim 1, wherein the edge grooves have a depth of 100 to 350 μm.

4. The liquid crystal display device according to claim 1, wherein the edge grooves are formed along long sides, or along short sides or along all four sides of the upper and lower plastic substrates.

5. The liquid crystal display device according to claim 1, wherein the edge grooves are formed in an interrupted groove configuration or continuous groove configuration.

6. The liquid crystal display device according to claim 1, wherein the subsidiary substrate is made of any one material selected from a group composed of glass, acrylic materials, and metals.

7. The liquid crystal display device according to claim 1, wherein the subsidiary substrate has a size equal to or bigger than that of the plastic substrate.

8. The liquid crystal display device according to claim 1, wherein the heat resistant tape has a thickness thinner than the depth of the edge grooves in the plastic substrate.

9. The liquid crystal display device according to claim 1, wherein the upper and lower plastic substrates are fabricated by a roll compression method employing a main roll with convex groove patterns and subsidiary roll below, or a press method with a mold frame having convex groove patterns.

10. The liquid crystal display device according to claim 9, wherein a radius r of the main roll in the roll compression method satisfies the equation $2\pi r=L$, in which L is a length of the plastic substrate.

11. The liquid crystal display device according to claim 1, wherein the convex groove patterns have a width two times larger than that of the edge grooves of the plastic substrate, and a length equal to that of the edge grooves of the plastic substrate.

12. A liquid crystal display device with plastic substrates, the liquid crystal display device comprising: a process table with a fixing device disposed within the edge grooves; upper and lower plastic substrates including edge grooves and fixed on the process table by the fixing device, and joined with liquid crystals sealed there-between; and alignment layers formed on each facing surfaces of upper and lower plastic substrates.

13. The liquid crystal display device according to claim 12, wherein the fixing device has a thickness thinner than a depth of the edge grooves in the plastic substrate.

* * * * *